(12) United States Patent
Asanovic et al.

(10) Patent No.: US 10,996,952 B2
(45) Date of Patent: May 4, 2021

(54) MACRO-OP FUSION

(71) Applicant: SiFive, Inc., San Mateo, CA (US)

(72) Inventors: Krste Asanovic, Berkeley, CA (US); Andrew Waterman, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 52 days.

(21) Appl. No.: 16/215,328

(22) Filed: Dec. 10, 2018

(65) Prior Publication Data
US 2020/0183687 A1 Jun. 11, 2020

(51) Int. Cl.
*G06F 9/30* (2018.01)
*G06F 9/38* (2018.01)

(52) U.S. Cl.
CPC ........ *G06F 9/3017* (2013.01); *G06F 9/30145* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 5,101,344 A * | 3/1992 | Bonet | G06F 9/30054 712/234 |
| 5,742,783 A | 4/1998 | Azmoodeh et al. | |
| 6,675,376 B2 | 1/2004 | Ronen et al. | |
| 2004/0153630 A1* | 8/2004 | Henry | G06F 9/30145 712/209 |
| 2011/0264891 A1* | 10/2011 | Parks | G06F 9/30181 712/200 |
| 2016/0179542 A1* | 6/2016 | Lai | G06F 9/3001 712/208 |
| 2017/0161067 A1* | 6/2017 | Henry | G06F 9/30145 |

OTHER PUBLICATIONS

Diba Mirza, CSE 30, UCSD.EDU, 2015 (Year: 2015).*
"The T9000 Transputer Hardware Reference Manual"; 1st edition; INMOS transputer databook series, SGS-Thompson Microelectronics, 1993; 356 pages.
Celio, et el.; "The Renewed Case for the Reduced Unstruction Set Computer: Avoiding ISA Bloat with Macro-Op Fusion for RISC-V"; Dept. of Electrical Engineering & Computer Sciences, University of California, Berkeley, Jul. 8, 2016; 16 pages.
International Search Report and Written Opinion for International Application No. PCT/US2019/065396 dated Feb. 28, 2020.

* cited by examiner

*Primary Examiner* — Hyun Nam
(74) *Attorney, Agent, or Firm* — Young Basile Hanlon & MacFarlane, P.C.

(57) ABSTRACT

Systems and methods are disclosed for macro-op fusion. Sequences of macro-ops that include a control-flow instruction are fused into single micro-ops for execution. The fused micro-ops may avoid the use of control-flow instructions, which may improve performance. A fusion predictor may be used to facilitate macro-op fusion.

39 Claims, 5 Drawing Sheets

MACRO-OP FUSION

TECHNICAL FIELD

This disclosure relates to macro-op fusion.

BACKGROUND

Processors sometimes perform macro-op fusion, where several Instruction Set Architecture (ISA) instructions are fused in the decode stage and handled as one internal operation. Macro-op fusion is a powerful technique to lower effective instruction count. Recent research into this issue, specifically in the context of RISC-V architectures, has identified a limited set of areas where macro-op fusion can avoid instruction set complexities. See, e.g. "The Renewed Case for the Reduced Instruction Set Computer: Avoiding ISA Bloat with Macro-Op Fusion for RISC-V" by Christopher Celio, et. al., 8 Jul. 2016, arXiv:1607.02318 [cs.AR]. However, that paper's approach does not contemplate a number of macro-op fusion opportunities that can increase efficiency. Intel has done work with fused instructions, such as that described in U.S. Pat. No. 6,675,376. Earlier work includes the T9000 Transputer by Inmos, as described in "the T9000 Transputer Hardware Reference Manual", Inmos, 1$^{st}$ Edition, 1993.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Disclosed herein are implementations of macro-op fusion.

In a first aspect, the subject matter described in this specification can be embodied in integrated circuit for executing instructions that include one or more execution resource circuits configured to execute micro-ops to support an instruction set including macro-ops; an instruction decode buffer configured to store macro-ops fetched from memory; and an instruction decoder circuit configured to: detect a sequence of macro-ops stored in the instruction decode buffer, the sequence of macro-ops including a control-flow macro-op followed by one or more additional macro-ops, determine a micro-op that is equivalent to the detected sequence of macro-ops, and forward the micro-op to at least one of the one or more execution resource circuits for execution.

In a second aspect, the subject matter described in this specification can be embodied in methods that include fetching macro-ops from memory and storing the macro-ops in an instruction decode buffer; detecting a sequence of macro-ops stored in the instruction decode buffer, the sequence of macro-ops including a control-flow macro-op followed by one or more additional macro-ops; determining a micro-op that is equivalent to the detected sequence of macro-ops; and forwarding the micro-op to at least one execution resource circuit for execution.

In a third aspect, the subject matter described in this specification can be embodied in integrated circuits for executing instructions that include one or more execution resource circuits configured to execute micro-ops to support an instruction set including macro-ops; an instruction decode buffer configured to store macro-ops fetched from memory; a fusion predictor circuit configured to: detect a prefix of a sequence of macro-ops in the instruction decode buffer, determine a prediction of whether the sequence of macro-ops will be completed in a next fetch of macro-ops from memory and fused, and, based on the prediction, delay execution of the prefix until after the next fetch to enable fusion of the sequence of macro-ops; and an instruction decoder circuit configured to: detect the sequence of macro-ops stored in the instruction decode buffer, determine a micro-op that is equivalent to the detected sequence of macro-ops, and forward the micro-op to at least one of the one or more execution resource circuits for execution.

These and other aspects of the present disclosure are disclosed in the following detailed description, the appended claims, and the accompanying figures.

Systems and methods for macro-op fusion are disclosed. An integrated circuit (e.g., a processor or microcontroller) may decode and execute macro-op instructions of an instruction set architecture (ISA) (e.g., a RISC V instruction set). A sequence of multiple macro-ops decoded by the integrated circuit may be fused (i.e., combined) into a single equivalent micro-op that is executed by the integrated circuit. In some implementations, a control-flow instruction may be fused with subsequent data-independent instructions to form an instruction that does not require a control-flow event in the pipeline. For example, a branch macro-op instruction may be replaced with a non-branch micro-op. Performance may be improved by effectively removing control-flow instructions through macro-op fusion. For example, performance degradation associated with branch prediction misses may be avoided.

In some conventional processors, a conditional branch would be predicted, and if predicted as taken, would normally initiate a pipeline flush. If the taken prediction was wrong, the pipeline would be flushed again to restart on a sequential path. If the conditional branch was predicted not-taken, but was actually taken, the pipeline would also be flushed. Only if the conditional branch was predicted not-taken and the branch was actually not-taken is the pipeline flush avoided. TABLE 1 below shows the number of pipeline flushes that may be carried out by a conventional processor using branch prediction.

TABLE 1

| Predicted | Actual | # Pipeline flushes |
| --- | --- | --- |
| T | T | 1 |
| T | N | 2 |
| N | T | 1 |
| N | N | 0 |

In some cases, where the branch may be difficult to predict, the branch can not only cause many pipeline flushes but can pollute the branch predictor, reducing performance for other predictable branches.

For example, an unconditional jump with a short forward offset may be fused with one or more subsequent instructions. The unconditional jump plus the instructions that are skipped over may be fused into a single non-jump micro-op that has no effect on the machine except advancing the program counter by the jump offset. A benefit may include replacing the pipeline flush that would typically be required to execute a jump with a no-operation (NOP) instruction that just advances the program counter without a pipeline flush. In some implementations, more than one instruction may be skipped over. In some implementations, one or more target instructions may also be fused into a micro-op.

For example, a conditional branch over one or more instructions may be fused. In some implementations, a conditional branch is fused with a following instruction such that the combination is executed as a single non-branch instruction. For example, the internal micro-op can either disable the write to the destination if the condition is false, or can be defined to always write the destination, which may simplify the operation of an out-of-order superscalar machine with register renaming. A fused micro-op may execute as a non-branch instruction, so that it avoids pipeline flushes, and in addition, avoids polluting branch predictor state. A sequence of macro-ops to be fused may include multiple instructions following a control-flow instruction.

For example, a branch instruction and a single jump instruction may be fused. Unconditional jump instructions can target instructions much further away than conditional branches, but sometimes a conditional branch to a far away target is desired. This can be accomplished with a sequence of instructions, which may be fused internally by a processor. For example, a branch instruction and a function-call sequence may be fused. Function call instructions are not conditional, so they may be paired with a separate branch to make them conditional. For example, a branch instruction and a long jump sequence may be fused. Unconditional jump instructions also have limited reach. To branch arbitrarily far away, a 3-instruction sequence and a scratch register may be utilized, which can be fused into a single micro-op. For example, a branch instruction and a long function-call sequence may be fused.

In some implementations, a dynamic fusion predictor may be used to facilitate macro-op fusion across instruction fetch boundaries in an instruction decode buffer. As instructions are fetched into the instruction decode buffer, there may be situations where the prefix of a potentially fusible sequence is present in the fetch buffer but the processor will have to wait to fetch additional instructions from memory before knowing for certain whether there is a fusible sequence. In some situations it may be beneficial to send the existing buffered prefix instructions into execution, while in other situations it may be beneficial to wait for the remaining instructions in the fusible sequence to be fetched and then fused with the buffered instructions. In general, there could be a performance or power advantage to either eagerly executing the prefix or waiting for the trailing instructions. A fixed policy may result in suboptimal performance.

For example, a dynamic "beneficial fusion" predictor may be utilized to inform the processor whether to delay executing the current instruction, or instructions, in the fetch buffer and to wait until additional instructions are fetched. In some implementations, the fusion predictor is only consulted and updated if one or more of the buffered instructions in the potential fusion sequence could have been sent into execution (i.e., execution resources were available), otherwise, the predictor is neither consulted nor updated.

For example, the fusion predictor entries can be indexed and/or tagged using one of many forms, such as, indexed by a program counter; indexed by hash of a current program counter and a program counter history; tagged, where each entry is tagged with a program counter; or tagless, where each entry is used without considering the program counter. For example, a program counter used to index the fusion predictor can be that used to fetch the last group of instructions, or the program counter of the potential fusion prefix, or the program counter of the next group to be fetched. For example, the entries in the fusion predictor might contain K-bit counters (K>=1) to provide hysteresis. The system may execute instruction sequences correctly regardless of the prediction made by the beneficial fusion predictor, and so a misprediction recovery mechanism may be omitted from the system.

A beneficial fusion predictor may be updated based on a performance model that inspects the instructions that are fetched after the potential fusion sequence to determine if waiting for these additional instructions would be beneficial. The performance model may includes a number of potential components, such as: 1) Can the newly fetched instruction fuse with the buffered instructions? 2) Would fusion prevent parallel issue of instructions that follow the fusible sequence in the new fetch group? 3) Are there instructions in the new fetch group that depend on instructions in the buffered fusion prefix such that stalls are created that would have been obviated by eagerly executing the prefix instructions?

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

The term "macro-op" is used to describe an instruction held in a format described by the processor's instruction set architecture (ISA). Macro-ops are the instruction format in which software is encoded for a machine and all processors implementing the same ISA use the same encoding for macro-ops. The term "micro-op" is used to describe an internal processor-specific encoding of the operations used to control execution resources, and can vary widely between different implementations of the same ISA. In various circumstances, the correspondence between macro-ops and micro-ops used a by a processor to implement supported macro-ops may be one-to-one, one-to-many, or many-to-one. For example, a single macro-op can be cracked into one or more internal micro-ops, and multiple macro-ops can also be fused into a single internal micro-op.

Details

Figure 1:
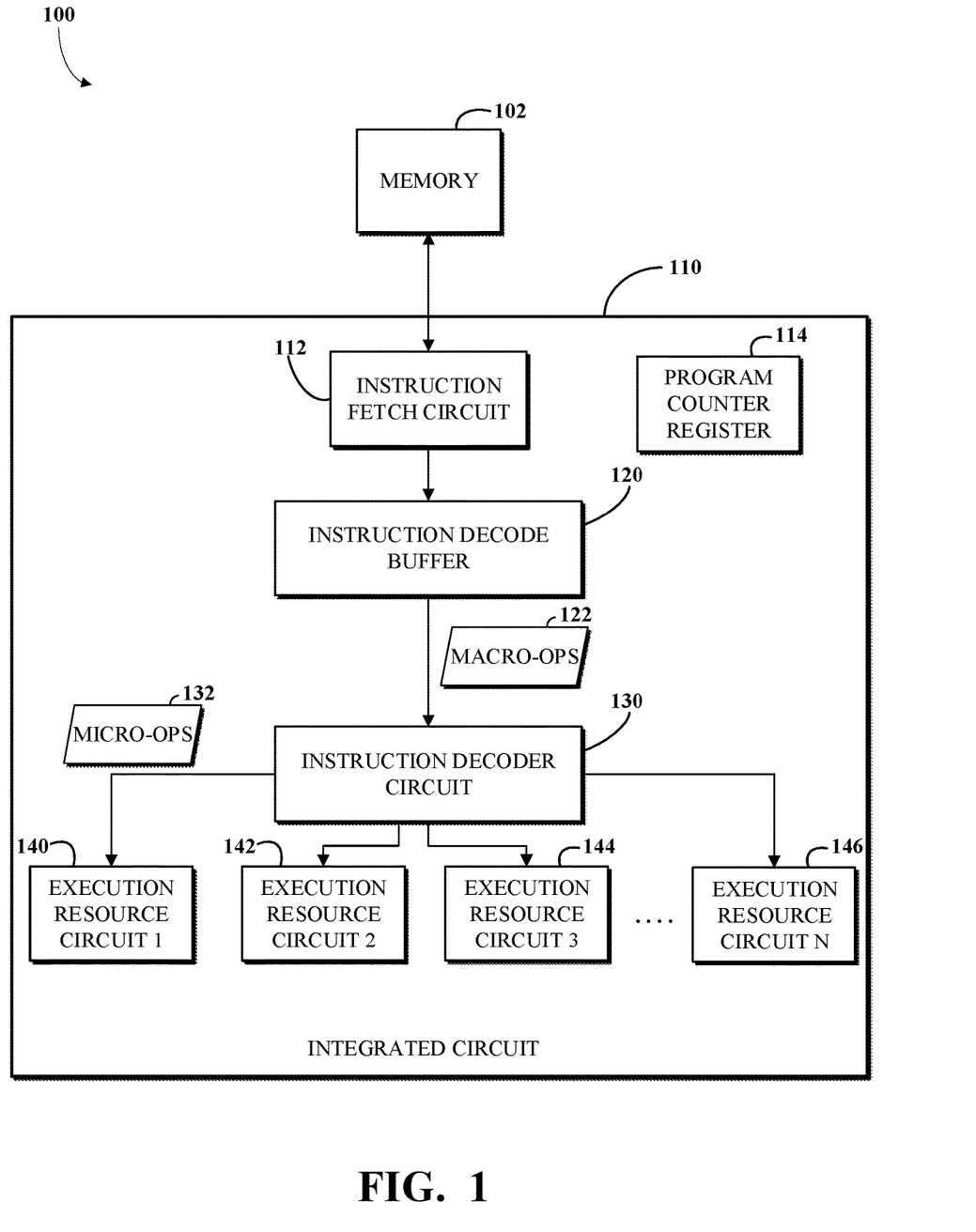
FIG. 1 is block diagram of an example of a system for executing instructions from an instruction set with macro-op fusion.

FIG. 1 is block diagram of an example of a system 100 for executing instructions from an instruction set with macro-op fusion. The system 100 includes a memory 102 storing instructions and an integrated circuit 110 configured to execute the instructions. For example, the integrated circuit may be a processor or a microcontroller. The integrated circuit 110 includes an instruction fetch circuit 112; a program counter register 114; an instruction decode buffer 120 configured to stores macro-ops 122 that have been fetched from the memory 102; an instruction decoder circuit 130 configured to decode macro-ops from the instruction decode buffer 120 to generate corresponding micro-ops 132 that are passed to one or more execution resource circuits (140, 142, 144, and 146) for execution. For example, the integrated circuit 110 may be configured to implement the process 400 of FIG. 4. The correspondence between macro-ops 122 and micro-ops is not always one-to-one. The instruction decoder circuit 130 is configured to fuse certain sequences of macro-ops 122 detected in the instruction decode buffer 120, determining a single equivalent micro-op 132 for execution using the one or more execution resource circuits (140, 142, 144, and 146).

The instruction fetch circuit 112 is configured to fetch macro-ops from the memory 102 and store them in the instruction decode buffer 120 while the macro-ops 122 are processed by a pipelined architecture of the integrated circuit 110.

The program counter register 114 may be configured to store a pointer to a next macro-op in memory. A program counter value stored in the program counter register 114 may be updated based on the progress of execution by the integrated circuit 110. For example, when an instruction is executed the program counter may be updated to point to a next instruction to be executed. For example, the program counter may be updated by a control-flow instruction to one of multiple possible values based on a result of testing a condition. For example, the program counter may be updated to a target address.

The integrated circuit 110 includes an instruction decode buffer 120 configured to store macro-ops fetched from memory 102. For example, the instruction decode buffer 120 may have a depth (e.g., 4, 8, 12, 16, or 24 instructions) that facilitates a pipelined and/or superscalar architecture of the integrated circuit 110. The macro-ops may be members of an instruction set (e.g., a RISC V instruction set, an x86 instruction set, an ARM instruction set, or a MIPS instruction set) supported by the integrated circuit 110.

The integrated circuit 110 includes one or more execution resource circuits (140, 142, 144, and 146) configured to execute micro-ops to support an instruction set including macro-ops. For example, the instruction set may be a RISC V instruction set. For example, the one or more execution resource circuits (140, 142, 144, and 146) may include an adder, a shift register, a multiplier, and/or a floating point unit. The one or more execution resource circuits (140, 142, 144, and 146) may update the state of the integrated circuit 110, including internal registers and/or flags or status bits (not explicitly shown in FIG. 1) based on results of executing a micro-op. Results of execution of a micro-op may also be written to the memory 102 (e.g., during subsequent stages of a pipelined execution).

The integrated circuit 110 includes an instruction decoder circuit 130 configured to decode the macro-ops 122 in the instruction decode buffer 120. The instruction decode buffer 120 may convert the macro-ops into corresponding micro-ops 132 that are internally executed by the integrated circuit using the one or more execution resource circuits (140, 142, 144, and 146). The instruction decoder circuit 130 is configured to implement macro-op fusion, where multiple macro-ops are converted to a single micro-op for execution.

For example, the instruction decoder circuit 130 may be configured to detect a sequence of macro-ops stored in the instruction decode buffer 120. For example, detecting the sequence of macro-ops may include detecting a sequence of opcodes as portions of the respective macro-ops. The sequence of macro-ops may include a control-flow macro-op (e.g., a branch instruction or a call instruction) followed by one or more additional macro-ops. The instruction decoder circuit 130 may determine a micro-op that is equivalent to the detected sequence of macro-ops. The instruction decoder circuit 130 may forward the micro-op to at least one of the one or more execution resource circuits (140, 142, 144, and 146) for execution. In some implementations, the control-flow macro-op is a branch instruction and the micro-op is not a branch instruction.

For example, the sequence of macro-ops may include an unconditional jump and one or more macro-ops that will be skipped, and the micro-op may be a NOP that advances the program counter to a target of the unconditional jump. For example, an unconditional jump with a short forward offset may be fused with one or more subsequent instructions. The unconditional jump plus the instructions that are skipped over may be fused into a single non-jump micro-op that has no effect on the machine except advancing the program counter by the jump offset. A benefit may include removing the pipeline flush that would typically be required to execute a jump with a no-operation (NOP) instruction that just advances the program counter without a pipeline flush. For example, the sequence of macro-ops:

j target
add x3, x3, 4
target: <next instruction> may be replaced with the fused micro-op:

nop_pc+8          # Advance program counter
                  # over skipped instruction In some implementations, more than one instruction may be skipped over. In some implementations, one or more target instructions may also be fused into a micro-op:

<next instruction>_pc+12

In some implementations, the sequence of macro-ops includes an unconditional jump, one or more macro-ops that will be skipped, and a macro-op at a target of the unconditional jump; and the micro-op performs a function of the macro-op at the target of the unconditional jump and advances the program counter to point to a next macro-op after the target of the unconditional jump.

For example, a conditional branch over one or more instructions may be fused. In some implementations, the sequence of macro-ops includes a conditional branch and one or more macro-ops after the conditional branch and before a target of the conditional branch, and the micro-op advances the program counter to the target of the conditional branch. In some implementations, a conditional branch is fused with a following instruction such that the combination is executed as a single non-branch instruction. For example, the sequence of macro-ops:

bne x1, x0, target
addi x3, x3, 1
target: <unrelated instruction> may be replaced with the fused micro-op:

ifeqz_addi x3, x3, x1, 1  # If x1==0, x3=x3+1,
                          # else x3=x3; PC+=8

For example, the internal micro-op can either disable the write to the destination if the condition is false, or can be defined to always write the destination, which may simplify the operation of an out-of-order superscalar machine with register renaming. A fused micro-op may execute as a non-branch instruction, so that it avoids pipeline flushes, and in addition, avoids polluting a branch predictor state. For example, the sequence of macro-ops:

```
bne x2, x3, target
sub x5, x7, x8
target: <unrelated instruction>
``` may be replaced with the fused micro-op:

```
ifeq_sub x5, x7, x8, x2, x3 # If x2==x3,
                           # x5=x7-x8,
                           # else x5=x5; PC+=8
```

In some implementations, the sequence of macro-ops includes a conditional branch and one or more macro-ops after the conditional branch and before a target of the conditional branch, and a macro-op at the target of the conditional branch; and the micro-op advances the program counter to point to a next macro-op after the target of the conditional branch.

A sequence of macro-ops to be fused may include multiple instructions following a control-flow instruction. For example, the sequence of macro-ops:

```
bne x2, x0, target
slli x1, x1, 2
ori x1, x1, 1
target: <unrelated instruction>
``` may be replaced with the fused micro-op:

```
ifeqz_sllori x1, x2, 2, 1 # If x2==0,
                         # then x1=(x1<<2)|1
                         # else x1=x1;PC+=12
```

For example, a branch instruction and a single jump instruction may be fused. Unconditional jump instructions can target instructions much further away than conditional branches, but sometimes a conditional branch to a far away target is desired. This can be accomplished with a sequence of instructions, which may be fused internally by a processor. In some implementations, the sequence of macro-ops includes a conditional branch followed by an unconditional jump. For example, the sequence of macro-ops:

```
beq x8, x9, skip
j target
skip: <unrelated instruction>
...
target: <unrelated instruction>
``` may be replaced with the fused micro-op:

```
jne x8, x9, target # If x8 !=x9,
                   # then PC=target else PC+=8
```

For example, a branch instruction and a function-call sequence may be fused. Function call instructions are not conditional, so may be paired with a separate branch to make conditional. In some implementations, the sequence of macro-ops includes a conditional branch followed by a jump and link. For example, the sequence of macro-ops:

```
c.bnez x8, skip # 2-byte compressed branch
jal x1, subroutine
skip: <unrelated instruction>
...
subroutine: <unrelated instruction>
``` may be replaced with the fused micro-op:

```
jalez x1, x8, subroutine # If x8==0,
                         # then x1=PC+6,
                         # PC=subroutine
                         # else x1=x1, PC=PC+6
```

For example, a branch instruction and a long jump sequence may be fused. Unconditional jump instructions also have limited reach. To branch arbitrarily far away, a 3-instruction sequence and a scratch register may be utilized, which can be fused into a single micro-op. In some implementations, the sequence of macro-ops includes a conditional branch followed by a pair of macro-ops implementing a long jump and link. For example, the sequence of macro-ops:

```
c.beqz x8, skip
1: auipc x6, %perel_hi(target)
jalr x0, %perel_lo(1b) (x6)
skip: <unrelated instruction>
...
target: <unrelated instruction>
``` may be replaced with the fused micro-op:

```
jnez_far x6, x8, target_hi, target
                # If x8 != 0, then
                # x6=target_hi, PC=target
                # else x6=x6, PC=PC+10
```

For example, a branch instruction and a long function-call sequence may be fused. In some implementations, the sequence of macro-ops includes a conditional branch followed by a pair of macro-ops implementing a long unconditional jump. For example, the sequence of macro-ops:

```
blt x8, x0, skip
1: auipc x1, %perel_hi(subroutine)
jalr x1, %perel_lo(1b) (x1)
skip: <unrelated instruction>
...
subroutine: <unrelated instruction>
``` may be replaced with the fused micro-op:

```
jalgez_far x1, x8, subroutine # If x8 >= 0, then
                              # x1=PC+12, PC=subroutine
                              # else x1=x1, PC=PC+12
```

The instruction decoder circuit 130 may be configured to detect and fuse multiple different sequences of macro-ops that include a control-flow instruction, such as the sequences macro-ops described above.

In some implementations (not shown in FIG. 1), the memory 102 may be included in the integrated circuit 110.

Figure 2:
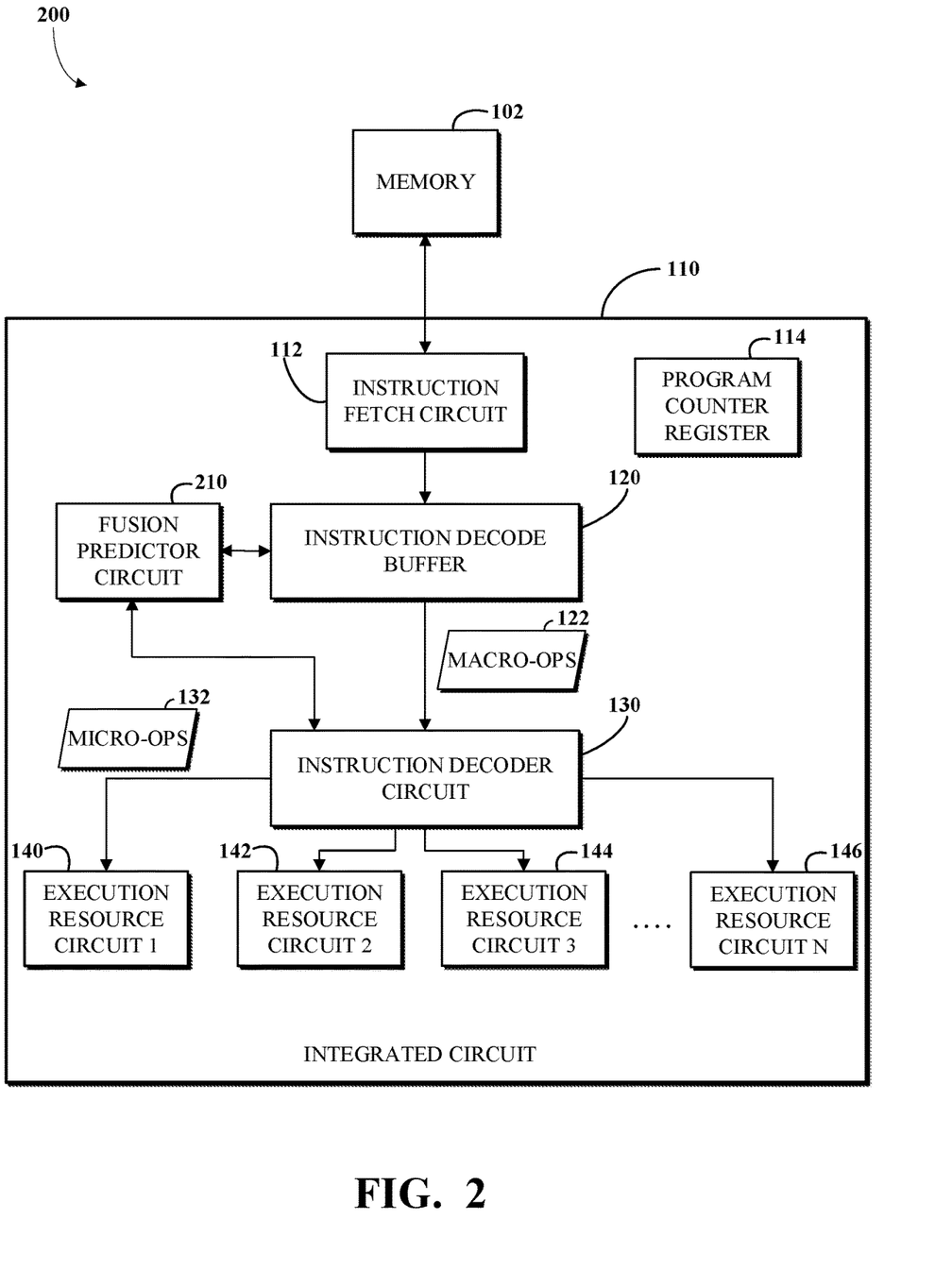
FIG. 2 is block diagram of an example of a system for executing instructions from an instruction set with macro-op fusion with fusion prediction.

FIG. 2 is block diagram of an example of a system 200 for executing instructions from an instruction set with macro-op fusion with fusion prediction. The system 200 is similar to the system 100 of FIG. 1, with the addition of fusion predictor circuit 210 configured to facilitate detection and beneficial fusion of candidate sequences of macro-ops. For example, the system 200 may be used to implement the process 400 of FIG. 4. For example, the system 200 may be used to implement the process 500 of FIG. 5. For example, the fusion predictor circuit 210 may include the fusion predictor circuit 310 of FIG. 3.

The system 200 includes a fusion predictor circuit 210 configured to detect a prefix of a sequence of macro-ops in the instruction decode buffer. For example, where the instruction decoder circuit 130 is configured to detect a sequence of macro-op instructions consisting of instructions 1 through N (e.g., N=2, 3, 4, or 5) when it occurs in the instruction decode buffer 120, the fusion predictor circuit 210 may be configured to detect prefixes including the one or more macro-op instructions 1 through m, where 1<=m<N, when they occur in the instruction decode buffer 120.

The fusion predictor circuit 210 is configured to determine a prediction of whether the sequence of macro-ops will be completed in a next fetch of macro-ops from memory and fused. For example, the prediction may be determined using a table of prediction counters that is maintained by the fusion predictor circuit 210. The prediction counters may serve as estimates of a likelihood that a prefix will be part of a sequence of macro-ops that is completed and fused. For example, the prediction counters may be K bit counters with K>1 (e.g., K=2) to provide some hysteresis. In some implementations, the table of prediction counters is indexed by a program counter stored in the program counter register 114. In some implementations, the table of prediction counters is tagged with program counter values.

Maintaining the table of prediction counters may include updating a prediction counter after a corresponding prefix is detected and the next set of instructions is fetched from memory. For example, the fusion predictor circuit 210 may be configured to update the table of prediction counters based on whether the sequence of macro-ops is completed by the next fetch of macro-ops from memory. For example, the fusion predictor circuit 210 may be configured to update the table of prediction counters based on whether there are instructions in the next fetch that depend on instructions in the prefix. For example, the fusion predictor circuit 210 may be configured to update the table of prediction counters based on whether fusion would prevent parallel issue of instructions that follow the fusible sequence in the next fetch group.

The fusion predictor circuit 210 is configured to, based on the prediction, delay execution of the prefix until after the next fetch to enable fusion of the sequence of macro-ops, or commence execution of the prefix before the next fetch and forego any possible fusion of a sequence including the prefix.

In some implementations (not shown in FIG. 2), the fusion predictor circuit 210 is implemented as part of the instruction decoder circuit 130.

Figure 3:
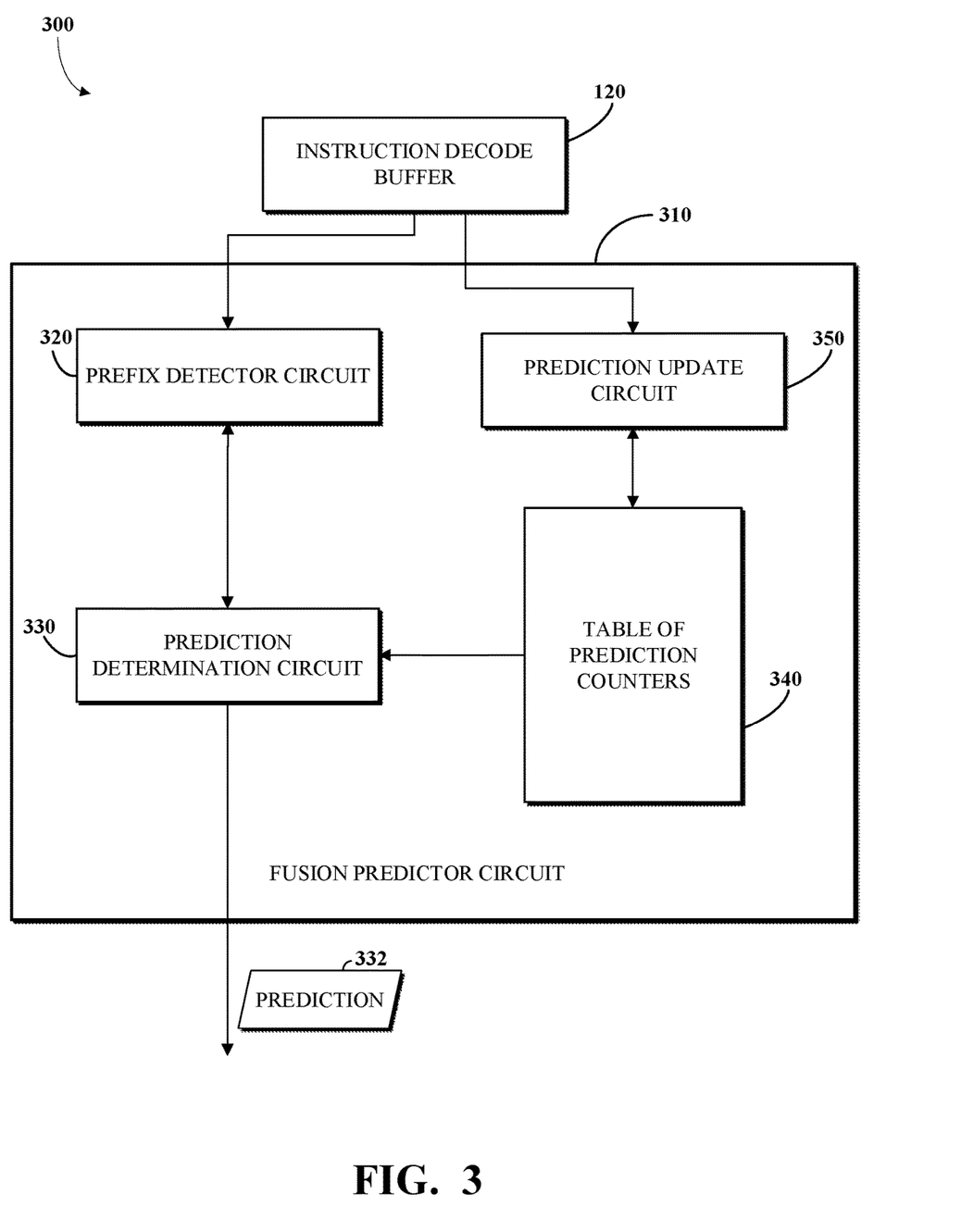
FIG. 3 is block diagram of an example of a system for fusion prediction.

FIG. 3 is block diagram of an example of a system 300 for fusion prediction. The system 300 includes an instruction decode buffer 120 and a fusion predictor circuit 310. The fusion predictor circuit 310 may be configured to examine macro-op instructions in the instruction decode buffer 120 to determine a prediction 332 of whether the sequence of macro-ops including a detected prefix will be completed in a next fetch of macro-ops from memory and fused. The fusion predictor circuit 310 includes a prefix detector circuit 320, a prediction determination circuit 330, a table of prediction counters 340, and a prediction update circuit 350. The fusion predictor circuit 310 may also be configured to examine macro-op instructions in the instruction decode buffer 120 to maintain a table of prediction counters 340. For example, the system 300 may be used as part of a larger system (e.g., the system 200 of FIG. 2) to implement the process 500 of FIG. 5.

The fusion predictor circuit 310 includes a prefix detector circuit 320 that is configured to detect a prefix of a sequence of macro-ops in the instruction decode buffer 120. For example, where an instruction decoder (e.g., the instruction decoder circuit 130) is configured to detect a sequence of macro-op instructions consisting of instructions 1 through N (e.g., N=2, 3, 4, or 5) when it occurs in the instruction decode buffer 120, the prefix detector circuit 320 may be configured to detect prefixes including the one or more macro-op instructions 1 through m, where 1<=m<N, when they occur in the instruction decode buffer 120. For example, the prefix detector circuit 320 may include a network of logic gates configured to set a flag when a sequence of m opcodes corresponding a prefix is read in the last m macro-ops stored in the instruction buffer.

The fusion predictor circuit 310 includes a prediction determination circuit 330 that is configured to determine a prediction 332 of whether a sequence of macro-ops will be completed in a next fetch of macro-ops from memory and fused. For example, the prediction 332 may include a binary value indicating whether a fusion with the detected prefix is expected to occur after the next fetch of macro-ops. For example, the prediction 332 may include an identifier of the prefix that has been detected. The prediction 332 may be determined by looking up a corresponding prediction counter in the table of prediction counters 340, and determining the prediction based on the value of the prediction counter. The prediction counters may serve as estimates of a likelihood that a prefix will be part of a sequence of macro-ops that is completed and fused. For example, the prediction counters stored in the table of prediction counters 340 may be K bit counters with K>1 (e.g., K=2) to provide some hysteresis. For example, a prediction 332 may be determined as true if a corresponding prediction counter has a current value$>=2^K$ (e.g., the last bit of the counter is a one), and determined as false otherwise. For example, the prediction determination circuit 330 may determine a binary portion of a prediction as the most significant bit of a corresponding K-bit prediction counter of the table of prediction counters 340.

In some implementations, the table of prediction counters 340 is indexed by a program counter. In some implementations, the table of prediction counters 340 is indexed by a hash of a program counter and program counter history. In some implementations, the table of prediction counters 340 is tagged with program counter values. For example, a program counter used to index the table of prediction counters 340 can be that used to fetch the last group of instructions, or the program counter of the potential fusion prefix, or the program counter of the next group to be fetched. In some implementations, the table of prediction counters 340 is tagless where the entries are used without considering a program counter. In some implementations, where multiple sequences of macro-ops and/or prefixes are sought for potential fusion, the table of prediction counters 340 may be tagged or indexed by an identifier of the detected prefix (e.g., a concatenation of one or more opcodes for the prefix or an index value associated with the prefix).

The fusion predictor circuit 310 includes a prediction update circuit 350, which may be configured to maintain the table of prediction counters 340. For example, the prediction update circuit 350 may be configured to update the table of prediction counters based on whether the sequence of macro-ops is completed by the next fetch of macro-ops from memory. For example, the prediction update circuit 350 may be configured to update the table of prediction counters based on whether there are instructions in the next fetch that depend on instructions in the prefix. For example, the prediction update circuit 350 may be configured to update the table of prediction counters based on whether fusion would prevent parallel issue of instructions that follow the fusible sequence in the next fetch group. In some implementations, the table of prediction counters 340 is only consulted and updated if one or more of the buffered macro-ops of the prefix of the potential fusion sequence could have been sent into execution (i.e., execution resources were available), otherwise, the table of prediction counters 340 is neither consulted nor updated.

The fusion predictor circuit 310 may, based on the prediction, delay execution of the prefix until after the next fetch to enable fusion of the sequence of macro-ops. For example, the delaying execution may include holding the one or more macro-ops of the prefix in a decode stage of a pipeline for multiple clock cycles.

For example, the system 300 may be part of a larger system, such as an integrated circuit (e.g., a processor or a microcontroller) for executing instructions. The instruction decode buffer 120 may be configured to store macro-ops fetched from memory. The integrated circuit may also include one or more execution resource circuits configured to execute micro-ops to support an instruction set (e.g., a RISC V instruction set, an x86 instruction set, an ARM instruction set, or a MIPS instruction set) including macro-ops. The integrated circuit may also include an instruction decoder circuit configured to detect the sequence of macro-ops stored in the instruction decode buffer, determine a micro-op that is equivalent to the detected sequence of macro-ops, and forward the micro-op to at least one of the one or more execution resource circuits for execution.

Figure 4:
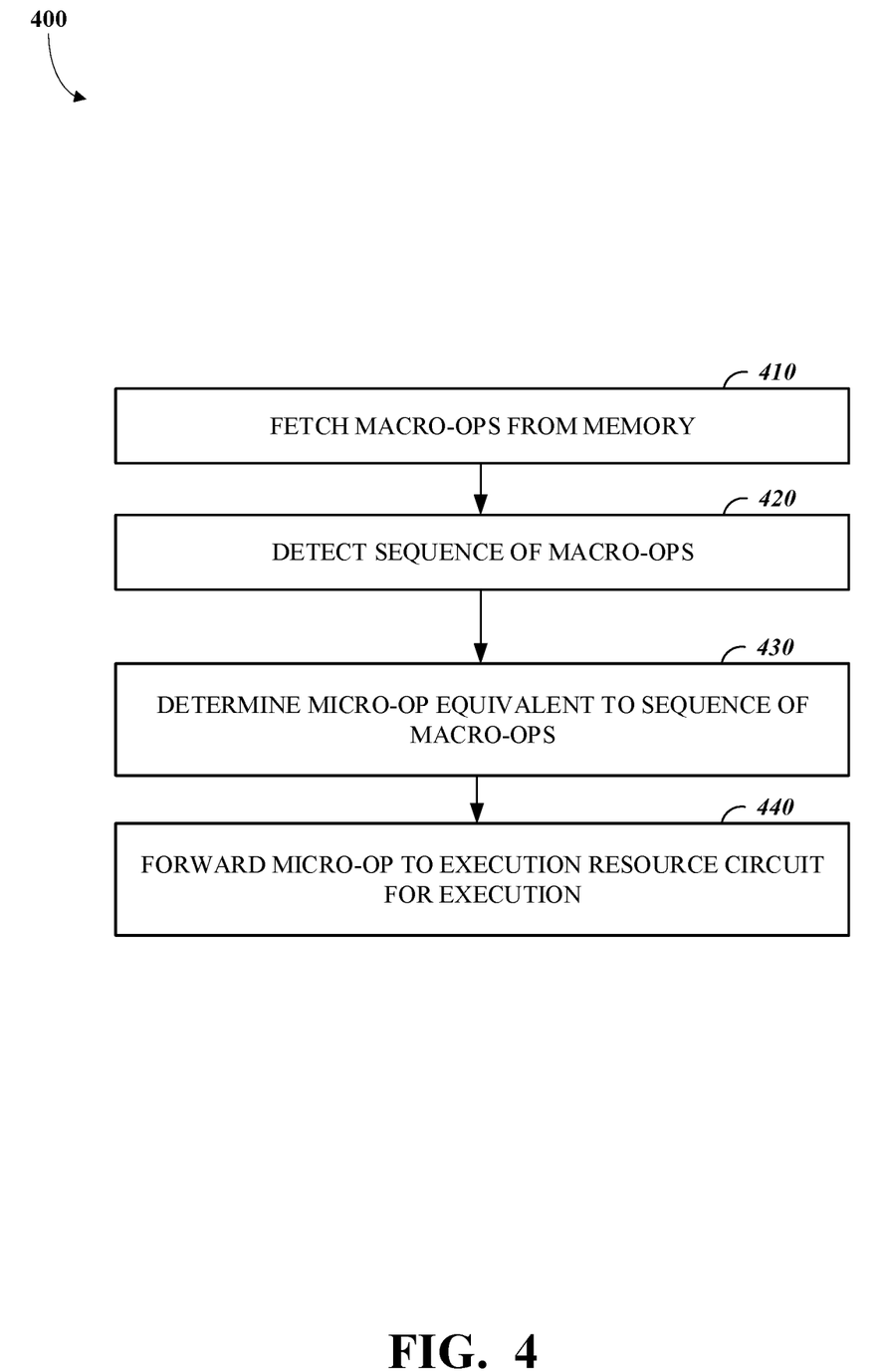
FIG. 4 is flow chart of an example of a process for executing instructions from an instruction set with macro-op fusion.

FIG. 4 is flow chart of an example of a process 400 for executing instructions from an instruction set with macro-op fusion. The process 400 includes fetching 410 macro-ops from memory; detecting 420 a sequence of macro-ops stored in the instruction decode buffer, the sequence of macro-ops including a control-flow macro-op followed by one or more additional macro-ops; determining 430 a micro-op that is equivalent to the detected sequence of macro-ops; and forwarding 440 the micro-op to at least one execution resource circuit for execution. For example, the process 400 may be implemented using the system 100 of FIG. 1. For example, the process 400 may be implemented using the system 200 of FIG. 2.

The process 400 includes fetching 410 macro-ops from memory and storing the macro-ops in an instruction decode buffer (e.g., the instruction decode buffer 120). The instruction decode buffer may be configured to store macro-ops fetched from memory while the macro-ops are processed by a pipelined architecture of an integrated circuit (e.g. a processor or microcontroller). For example, the instruction decode buffer may have a depth (e.g., 4, 8, 12, 16, or 24 instructions) that facilitates a pipelined and/or superscalar architecture of the integrated circuit. The macro-ops may be members of an instruction set (e.g., a RISC V instruction set, an x86 instruction set, an ARM instruction set, or a MIPS instruction set) supported by the integrated circuit.

The process 400 includes detecting 420 a sequence of macro-ops stored in the instruction decode buffer, the sequence of macro-ops including a control-flow macro-op followed by one or more additional macro-ops. For example, detecting 420 the sequence of macro-ops may include detecting a sequence of opcodes as portions of the respective macro-ops. The sequence of macro-ops may include a control-flow macro-op (e.g., a branch instruction or a procedure call instruction) and one or more additional macro-ops. In some implementations, detecting 420 the sequence of macro-ops in time to facilitate macro-op fusion is enabled by using a fusion predictor (e.g., the fusion predictor circuit 310 of FIG. 3) to first detect a prefix of the sequence and delay execution of the prefix until the remainder of the sequence on macro-ops is fetched 410 from memory. For example, the process 500 of FIG. 5 may be implemented to facilitate detection and fusing of the sequence of macro-ops.

The process 400 includes determining 430 a micro-op that is equivalent to the detected sequence of macro-ops. For example, the control-flow instruction may effectively be removed from the program where the micro-op that is determined 430 does not include a control-flow aspect. In some implementations, the control-flow macro-op is a branch instruction and the micro-op is not a branch instruction. Removing branches or other control-flow instructions may improve performance of an integrated circuit executing a program including the macro-ops. For example, performance may be improved by avoiding pipeline flushes associated with control-flow instructions and/or avoiding polluting a branch predictor state.

For example, the sequence of macro-ops may include an unconditional jump and one or more macro-ops that will be skipped, and the micro-op may be a NOP that advances the program counter to a target of the unconditional jump. For example, an unconditional jump with a short forward offset may be fused with one or more subsequent instructions. The unconditional jump plus the instructions that are skipped over may be fused into a single non-jump micro-op that has no effect on the machine except advancing the program counter by the jump offset. A benefit may include removing the pipeline flush that would typically be required to execute a jump with a no-operation (NOP) instruction that just advances the program counter without a pipeline flush. For example, for the sequence of macro-ops:

```
j target
add x3, x3, 4
target: <next instruction>
``` the micro-op may be determined 430 as:

```
nop_pc+8    # Advance program counter over
            # skipped instruction
```

In some implementations, more than one instruction may be skipped over. In some implementations, one or more target instructions may also be fused into a micro-op. For example, the micro-op may be determined 430 as:

```
<next instruction>pc+12
```

In some implementations, the sequence of macro-ops includes an unconditional jump, one or more macro-ops that will be skipped, and a macro-op at a target of the unconditional jump; and the micro-op performs a function of the macro-op at the target of the unconditional jump and advances the program counter to point to a next macro-op after the target of the unconditional jump.

For example, a conditional branch over one or more instructions may be fused. In some implementations, the sequence of macro-ops includes a conditional branch and one or more macro-ops after the conditional branch and before a target of the conditional branch, and the micro-op advances the program counter to the target of the conditional branch. In some implementations, a conditional branch is fused with a following instruction such that the combination is executed as a single non-branch instruction. For example, for the sequence of macro-ops:

```
bne x1, x0, target
addi x3, x3, 1
target: <unrelated instruction>
``` the micro-op may be determined 430 as:

```
ifeqz_addi x3, x3, x1, 1 # If x1==0, x3=x3+1,
                        # else x3=x3; PC+=8
```

For example, the internal micro-op can either disable the write to the destination if the condition is false, or can be defined to always write the destination, which may simplify the operation of an out-of-order superscalar machine with register renaming. A fused micro-op may execute as a non-branch instruction, so that it avoids pipeline flushes, and in addition, avoids polluting a branch predictor state. For example, for the sequence of macro-ops:

```
bne x2, x3, target
sub x5, x7, x8
target: <unrelated instruction>
``` the micro-op may be determined 430 as:

```
ifeq_sub x5, x7, x8, x2, x3 # If x2==x3,
                            # x5=x7-x8, else
                            # x5=x5; PC+=8
```

In some implementations, the sequence of macro-ops includes a conditional branch and one or more macro-ops after the conditional branch and before a target of the conditional branch, and a macro-op at the target of the conditional branch; and the micro-op advances the program counter to point to a next macro-op after the target of the conditional branch.

A sequence of macro-ops to be fused may include multiple instructions following a control-flow instruction. For example, for the sequence of macro-ops:

```
bne x2, x0, target
slli x1, x1, 2
ori x1, x1, 1
target: <unrelated instruction>
``` the micro-op may be determined 430 as:

```
ifeqz_sllori x1, x2, 2, 1 # If x2==0 then
                         # x1=(x1<<2)|1 else
                         # x1=x1;PC+=12
```

For example, a branch instruction and a single jump instruction may be fused. Unconditional jump instructions can target instructions much further away than conditional branches, but sometimes a conditional branch to a far away target is desired. This can be accomplished with a sequence of instructions, which may be fused internally by a processor. In some implementations, the sequence of macro-ops includes a conditional branch followed by an unconditional jump. For example, for the sequence of macro-ops:

```
beq x8, x9, skip
j target
skip: <unrelated instruction>
...
target: <unrelated instruction>
``` the micro-op may be determined 430 as:

```
jne x8, x9, target # If x8 != x9, then
                   # PC=target else PC+=8
```

For example, a branch instruction and a function-call sequence may be fused. Function call instructions are not conditional, so may be paired with a separate branch to make conditional. In some implementations, the sequence of macro-ops includes a conditional branch followed by a jump and link. For example, for the sequence of macro-ops:

```
c.bnez x8, skip If 2-byte compressed branch
jal x1, subroutine
skip: <unrelated instruction>
...
subroutine: <unrelated instruction>
``` the micro-op may be determined 430 as:

```
jalez x1, x8, subroutine # If x8==0, then
                         # x1=PC+6, PC=subroutine
                         # else x1=x1, PC=PC+6
```

For example, a branch instruction and a long jump sequence may be fused. Unconditional jump instructions also have limited reach. To branch arbitrarily far away, a 3-instruction sequence and a scratch register may be utilized, which can be fused into a single micro-op. In some implementations, the sequence of macro-ops includes a conditional branch followed by a pair of macro-ops implementing a long jump and link. For example, for the sequence of macro-ops:

```
c.beqz x8, skip
1: auipc x6, %pcrel_hi (target)
jalr x0, %pcrel_lo(1b) (x6)
skip: <unrelated instruction>
...
target: <unrelated instruction>
``` the micro-op may be determined 430 as:

```
jnez_far x6, x8, target_hi, target  # If x8 != 0,
                                    # then x6=target hi, PC=target
                                    # else x6=x6, PC=PC+10
```

For example, a branch instruction and a long function-call sequence may be fused. In some implementations, the sequence of macro-ops includes a conditional branch followed by a pair of macro-ops implementing a long unconditional jump. For example, for the sequence of macro-ops:

```
     blt x8, x0, skip
1:   auipc x1, %pcrel_hi(subroutine)
     jalr x1, %pcrel_lo(1b) (x1)
     skip: <unrelated instruction>
     ...
     subroutine: <unrelated instruction>
``` the micro-op may be determined 430 as:

```
jalgez_far x1, x8, subroutine  # If x8 >= 0,
                               # then x1=PC+12, PC=subroutine
                               # else x1=x1, PC=PC+12
```

The process 400 includes forwarding 440 the micro-op to at least one execution resource circuit for execution. The at least one execution resource circuit (e.g., 140, 142, 144, and/or 146 of FIG. 1) may be configured to execute micro-ops to support an instruction set including macro-ops. For example, the instruction set may be a RISC V instruction set. For example, the at least one execution resource circuit may include an adder, a shift register, a multiplier, and/or a floating point unit. The at least one execution resource circuit may update the state of an integrated circuit (e.g., a processor or microcontroller) that is implementing the process 400, including internal registers and/or flags or status bits based on results of executing a micro-op. Results of execution of a micro-op may also be written to the memory (e.g., during subsequent stages of a pipelined execution).

Figure 5:
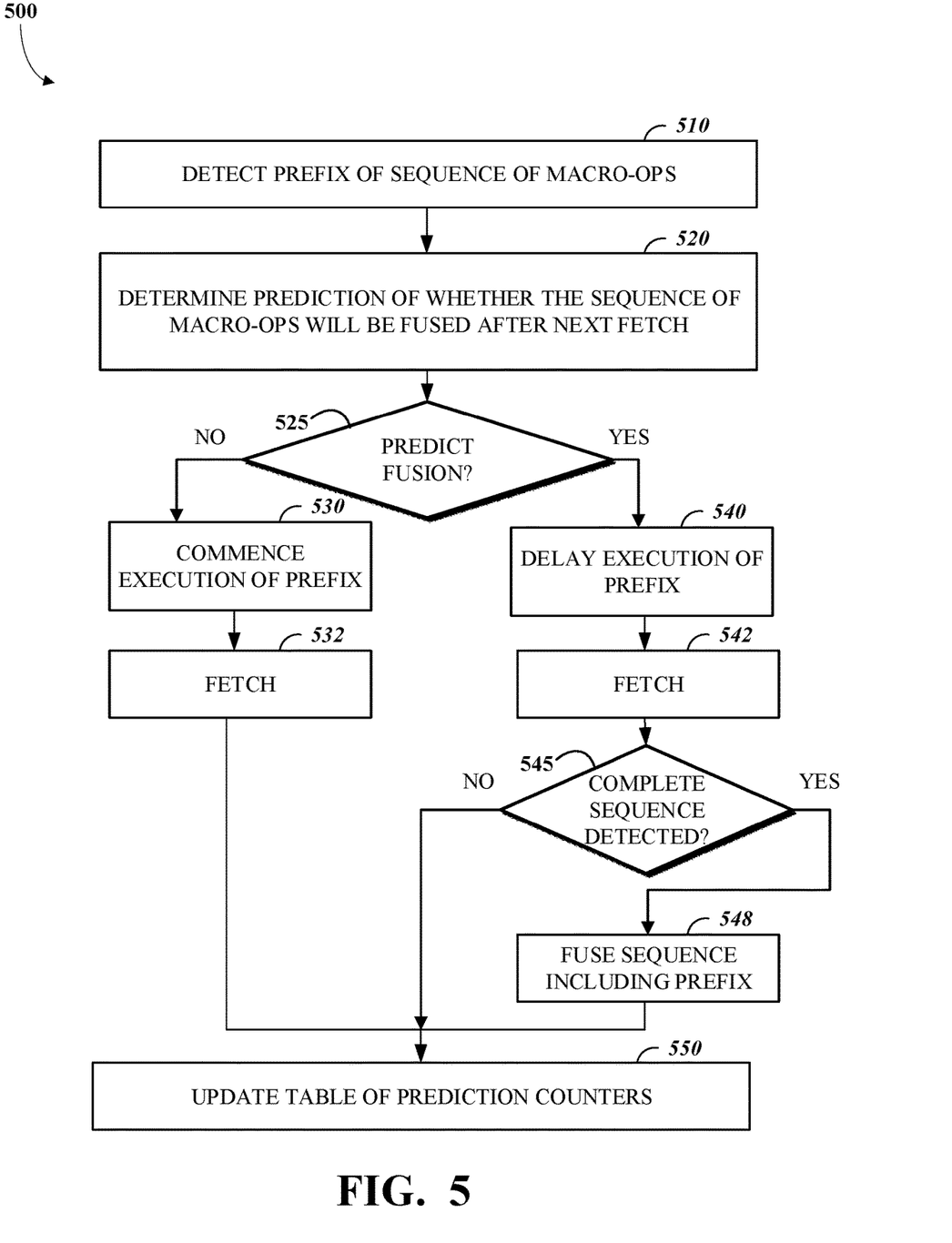
FIG. 5 is flow chart of an example of a process for predicting beneficial macro-op fusion.

FIG. 5 is flow chart of an example of a process 500 for predicting beneficial macro-op fusion. The process 500 includes detecting 510 a prefix of the sequence of macro-ops; determining 520 a prediction of whether the sequence of macro-ops will be completed in a next fetch of macro-ops from memory and fused; when no fusion is predicted, commence 530 execution of the prefix prior to fetching 532 a next batch of one or more macro-ops; when fusion is predicted, delaying 540 execution of the prefix until after fetching 542 a next batch of one or more macro-ops; if the complete sequence of macro-ops is detected 545, fusing 548 the sequence of macro-ops including the prefix; and updating 550 a table of prediction counters. For example, the process 500 may be implemented using the fusion predictor circuit 210 of FIG. 2. For example, the process 500 may be implemented using the fusion predictor circuit 310 of FIG. 3. The process 500 may be utilized to facilitate fusion of many different types of sequences of macro-ops, including sequences that may lack a control-flow instruction.

The process 500 includes detecting 510 a prefix of the sequence of macro-ops in an instruction decode buffer (e.g., the instruction decode buffer 120). For example, where an instruction decoder is configured to detect a sequence of macro-op instructions that includes instructions 1 through N (e.g., N=2, 3, 4, or 5) when it occurs in the instruction decode buffer, prefixes including the one or more macro-op instructions 1 through m, where 1<=m<N, may be detected 510 when they occur in the instruction decode buffer. For example, detecting 510 the prefix may include detecting a sequence of opcodes as portions of the respective macro-ops of the prefix.

The process 500 includes determining 520 a prediction of whether the sequence of macro-ops will be completed in a next fetch of macro-ops from memory and fused. For example, the prediction may be determined 520 using a table of prediction counters that is maintained by a fusion predictor circuit. The prediction counters may serve as estimates of a likelihood that a prefix will be part of a sequence of macro-ops that is completed and fused. For example, the prediction counters may be K bit counters with K>1 (e.g., K=2) to provide some hysteresis. For example, a prediction may be determined 520 as yes or true if a corresponding prediction counter has a current value>=2^K (e.g., the last bit of the counter is a one), and determined 520 as no or false otherwise. In some implementations, the table of prediction counters is indexed by a program counter. In some implementations, the table of prediction counters is indexed by a hash of a program counter and program counter history. In some implementations, the table of prediction counters is tagged with program counter values. For example, a program counter used to index the table of prediction counters can be that used to fetch the last group of instructions, or the program counter of the potential fusion prefix, or the program counter of the next group to be fetched. In some implementations, the table of prediction counters is tagless where the entries are used without considering a program counter.

The process 500 includes, if (at operation 525) no fusion is predicted to occur, then execution of the prefix is commenced 530 prior to fetching 532 a next batch of one or more macro-ops. For example, the commencing 530 execution of the prefix may include forwarding a micro-op version of a macro-op of the prefix to one or more execution resources for execution.

The process 500 includes, if (at operation 525) a fusion is predicted to occur, based on the prediction, delaying 540 execution of the prefix until after a next fetch to enable fusion of the sequence of macro-ops. For example, the delaying 540 execution may include holding the one or more macro-ops of the prefix in a decode stage of a pipeline for multiple clock cycles.

After fetching 542 a next batch of one or more macro-ops, if (at operation 545) the complete sequence of macro-ops is detected, then the complete sequence of macro-ops, including the prefix, is fused 548 to form a single micro-op for execution. For example, the sequence of macro-ops may be fused 548 using the process 400 of FIG. 4. If (at operation 545) the complete sequence of macro-ops is not detected, then execution proceeds as normal, starting with the delayed 540 instructions of the prefix.

The process 500 includes maintaining a table of prediction counters that is used for determining 520 predictions. For example, the process 500 include updating 550 the table of prediction counters after detecting 510 a prefix a fetching (532 or 542) a next batch of one or more macro-ops. For example, the table of prediction counters may be updated 550 based on whether the sequence of macro-ops is completed by the next fetch of macro-ops from memory. For example, the table of prediction counters may be updated 550 based on whether there are instructions in the next fetch that depend on instructions in the prefix. For example, the table of prediction counters may be updated 550 based on whether fusion would prevent parallel issue of instructions that follow the fusible sequence in the next fetch group.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit for executing instructions comprising:
   one or more execution resource circuits configured to execute micro-ops to support an instruction set including macro-ops,
   an instruction decode buffer configured to store macro-ops fetched from memory,
   an instruction decoder circuit configured to:
      detect a sequence of macro-ops stored in the instruction decode buffer, the sequence of macro-ops including a control-flow macro-op followed by one or more additional macro-ops;
      determine a micro-op that is equivalent to the detected sequence of macro-ops; and
      forward the micro-op to at least one of the one or more execution resource circuits for execution, and
   a fusion predictor circuit configured to:
      detect a prefix of the sequence of macro-ops in the instruction decode buffer;
      determine a prediction of whether the sequence of macro-ops will be completed in a next fetch of macro-ops from memory and fused; and
      based on the prediction, delay execution of the prefix until after the next fetch to enable fusion of the sequence of macro-ops.

2. The integrated circuit of claim 1, in which the control-flow macro-op is a branch instruction and the micro-op is not a branch instruction.

3. The integrated circuit of claim 1, in which the sequence of macro-ops includes an unconditional jump and one or more macro-ops that will be skipped, and the micro-op is a NOP that advances a program counter to a target of the unconditional jump.

4. The integrated circuit of claim 1, in which the sequence of macro-ops includes an unconditional jump, one or more macro-ops that will be skipped, and a macro-op at a target of the unconditional jump; and the micro-op performs a function of the macro-op at the target of the unconditional jump and advances a program counter to point to a next macro-op after the target of the unconditional jump.

5. The integrated circuit of claim 1, in which the sequence of macro-ops includes a conditional branch and one or more macro-ops after the conditional branch and before a target of the conditional branch, and the micro-op advances a program counter to the target of the conditional branch.

6. The integrated circuit of claim 1, in which the sequence of macro-ops includes a conditional branch and one or more macro-ops after the conditional branch and before a target of the conditional branch, and a macro-op at the target of the conditional branch; and the micro-op advances a program counter to point to a next macro-op after the target of the conditional branch.

7. The integrated circuit of claim 1, in which the sequence of macro-ops includes a conditional branch followed by an unconditional jump.

8. The integrated circuit of claim 1, in which the sequence of macro-ops includes a conditional branch followed by a jump and link.

9. The integrated circuit of claim 1, in which the sequence of macro-ops includes a conditional branch followed by a pair of macro-ops implementing a long jump and link.

10. The integrated circuit of claim 1, in which the sequence of macro-ops includes a conditional branch followed by a pair of macro-ops implementing a long unconditional jump.

11. The integrated circuit of claim 1, in which the fusion predictor circuit is configured to: maintain a table of prediction counters, wherein the table of prediction counters is used to determine the prediction.

12. The integrated circuit of claim 11, in which the table of prediction counters is indexed by a program counter.

13. The integrated circuit of claim 11, in which the table of prediction counters is tagged with program counter values.

14. The integrated circuit of claim 11, in which the fusion predictor circuit is configured to update the table of prediction counters based on whether the sequence of macro-ops is completed by the next fetch of macro-ops from memory.

15. The integrated circuit of claim 11, in which the fusion predictor circuit is configured to update the table of prediction counters based on whether there are instructions in the next fetch that depend on instructions in the prefix.

16. The integrated circuit of claim 1, in which the instruction set is a RISC V instruction set.

17. A method comprising:
   fetching macro-ops from memory and storing the macro-ops in an instruction decode buffer;
   detecting a sequence of macro-ops stored in the instruction decode buffer, the sequence of macro-ops including a control-flow macro-op followed by one or more additional macro-ops;
   determining a micro-op that is equivalent to the detected sequence of macro-ops;
   forwarding the micro-op to at least one execution resource circuit for execution;
   detecting a prefix of the sequence of macro-ops in the instruction decode buffer;
   determining a prediction of whether the sequence of macro-ops will be completed in a next fetch of macro-ops from memory and fused; and
   based on the prediction, delaying execution of the prefix until after the next fetch to enable fusion of the sequence of macro-ops.

18. The method of claim 17, in which the control-flow macro-op is branch instruction and the micro-op is not a branch instruction.

19. The method of claim 17, in which the sequence of macro-ops includes an unconditional jump and one or more macro-ops that will be skipped, and the micro-op is a NOP that advances a program counter to a target of the unconditional jump.

20. The method of claim 17, in which the sequence of macro-ops includes an unconditional jump, one or more macro-ops that will be skipped, and a macro-op at a target of the unconditional jump; and the micro-op performs a function of the macro-op at the target of the unconditional jump and advances a program counter to point to a next macro-op after the target of the unconditional jump.

21. The method of claim 17, in which the sequence of macro-ops includes a conditional branch and one or more macro-ops after the conditional branch and before a target of the conditional branch, and the micro-op advances a program counter to the target of the conditional branch.

22. The method of claim 17, in which the sequence of macro-ops includes a conditional branch and one or more macro-ops after the conditional branch and before a target of the conditional branch, and a macro-op at the target of the conditional branch; and the micro-op advances a program counter to point to a next macro-op after the target of the conditional branch.

23. The method of claim 17, in which the sequence of macro-ops includes a conditional branch followed by an unconditional jump.

24. The method of claim 17, in which the sequence of macro-ops includes a conditional branch followed by a jump and link.

25. The method of claim 17, in which the sequence of macro-ops includes a conditional branch followed by a pair of macro-ops implementing a long jump and link.

26. The method of claim 17, in which the sequence of macro-ops includes a conditional branch followed by a pair of macro-ops implementing a long unconditional jump.

27. The method of claim 17, comprising:
maintaining a table of prediction counters, wherein the table of prediction counters is used to determine the prediction.

28. The method of claim 27, in which the table of prediction counters is indexed by a program counter.

29. The method of claim 27, in which the table of prediction counters is tagged with program counter values.

30. The method of claim 27, comprising:
updating the table of prediction counters based on whether the sequence of macro-ops is completed by the next fetch of macro-ops from memory.

31. The method of claim 27, comprising:
updating the table of prediction counters based on whether there are instructions in the next fetch that depend on instructions in the prefix.

32. An integrated circuit for executing instructions comprising:
one or more execution resource circuits configured to execute micro-ops to support an instruction set including macro-ops;
an instruction decode buffer configured to store macro-ops fetched from memory;
a fusion predictor circuit configured to:
detect a prefix of a sequence of macro-ops in the instruction decode buffer,
determine a prediction of whether the sequence of macro-ops will be completed in a next fetch of macro-ops from memory and fused, and
based on the prediction, delay execution of the prefix until after the next fetch to enable fusion of the sequence of macro-ops; and
an instruction decoder circuit configured to:
detect the sequence of macro-ops stored in the instruction decode buffer,
determine a micro-op that is equivalent to the detected sequence of macro-ops, and
forward the micro-op to at least one of the one or more execution resource circuits for execution.

33. The integrated circuit of claim 32, in which the fusion predictor circuit is configured to: maintain a table of prediction counters, wherein the table of prediction counters is used to determine the prediction.

34. The integrated circuit of claim 33, in which the table of prediction counters is indexed by a program counter.

35. The integrated circuit of claim 33, in which the table of prediction counters is tagged with program counter values.

36. The integrated circuit of claim 33, in which the fusion predictor circuit is configured to update the table of prediction counters based on whether the sequence of macro-ops is completed by the next fetch of macro-ops from memory.

37. The integrated circuit of claim 33, in which the fusion predictor circuit is configured to update the table of prediction counters based on whether there are instructions in the next fetch that depend on instructions in the prefix.

38. The integrated circuit of claim 32, in which the sequence of macro-ops includes an unconditional jump and one or more macro-ops that will be skipped, and the micro-op is a NOP that advances a program counter to a target of the unconditional jump.

39. The integrated circuit of claim 32, in which the sequence of macro-ops includes an unconditional jump, one or more macro-ops that will be skipped, and a macro-op at a target of the unconditional jump; and the micro-op performs a function of the macro-op at the target of the unconditional jump and advances a program counter to point to a next macro-op after the target of the unconditional jump.

* * * * *